United States Patent [19]

Gracia

[11] 3,911,690

[45] Oct. 14, 1975

[54] OFFSHORE PIPELINE LAYING

[75] Inventor: Bert E. Gracia, Houston, Tex.

[73] Assignee: Brown & Root, Inc., Houston, Tex.

[22] Filed: July 26, 1974

[21] Appl. No.: 492,263

[52] U.S. Cl.................................. 61/72.3; 242/1
[51] Int. Cl.².................. F16L 1/00; B63B 35/04
[58] Field of Search.................. 61/72.3, 72.1, 72.4; 285/168, 18; 242/1

[56] References Cited
UNITED STATES PATENTS

| | | | |
|---|---|---|---|
| 486,986 | 11/1892 | Schinke | 61/72.3 |
| 2,924,328 | 2/1960 | Lidderdale | 61/72.3 |
| 3,727,954 | 4/1973 | Oliver | 61/72.3 |

Primary Examiner—Jacob Shapiro
Attorney, Agent, or Firm—James E. Cockfield

[57] ABSTRACT

A pipeline assembly is laid from a vessel into a body of water by passing the pipeline through the water in a substantially vertical path for a substantial portion of its descending travel. Near the end of its descent, as it approaches contact with the bed of the body of water, the pipeline assumes a curved transition profile. The pipeline is formed initially on the vessel by connecting a plurality of rigid pipe sections in end-to-end fashion, for relative pivotal movement. The pivotal connection between the pipe sections allows the pipeline to pass from a fore-to-aft feed path on the vessel into its substantially vertical descent path, and from the substantially vertical descent path into a curved transition profile, without the generation of unduly high stresses in the pipeline.

11 Claims, 4 Drawing Figures

U.S. Patent   Oct. 14, 1975   Sheet 2 of 2   3,911,690

OFFSHORE PIPELINE LAYING

BACKGROUND AND OBJECTS OF THE INVENTION

The present invention relates to the offshore laying of pipeline from a floating vessel.

Techniques employed for the offshore laying of pipeline can vary, depending for example upon the nature of the pipeline being laid. Pipeline of relatively small cross-section may be formed sufficiently flexible to be stored on reels. During the laying operation the profile is unwound from the reel and deposited into a body of water. Larger and heaview types of pipeline are usually laid by welding together a series of rigid pipe sections aboard the offshore lay vessel.

The actual laying operation proceeds in such a manner that the pipeline is gradually paid-out from the vessel as the vessel advances through the water. The pipeline assumes a sloping trajectory from the vessel to the waterbed, between which it is supported in catenary fashion. In such instances, there may be a natural tendency for the pipeline to sag. It is imperative, however, that the pipeline does not sag to such a degree that an unduly small radius of curvature is established. Otherwise, stressing of the pipeline can exceed the elastic limit thereof so as to produce adverse effects such as the formation of buckles, cracks, or other disabling deformations in the pipeline.

In order to control the profile of the pipeline being laid so as to prevent undue bending thereof, it has been customary to utilize control apparatus in the form of submerged ramps and/or tensioner units. Apparatus and techniques of this type have been proposed, for example, in U.S. Pat. Nos. 3,390,532, 3,539,024, 3,606,759, and Re. 27,420; all assigned to the assignee of the present invention, and also in U.S. Pat. Nos. 3,641,778 and 3,680,342. Submerged ramps and tensioner units have proven to be capable of exerting the requisite vertical and longitudinal restraints to counter the weight and bending forces generated by a descending pipeline.

It will be understood, however, that the forces to be countered increase in magnitude as the length of pipeline suspended between the waterbed and the vessel increases. Such increases in suspended pipeline length are a function of numerous factors, including the depth of the water in which the laying operations take place. That is, waters of greater depth require a greater span of suspended pipeline in order to maintain proper profile control.

Due to the expansion of oil-related activities into deep water areas, such as the North Sea for example, very deep water conditions are being encountered with more frequency. For example, in the oil-bearing regions of the North Sea, there exists a stretch of water between Norway and Scotland, depicted schematically in cross-section in FIG. 4. This stretch of water is characterized by a deeply recessed channel known as the Norway Groove. Water depths here may reach levels on the order of 600 feet or more. The laying of pipeline in water depths of this magnitude by means of previously proposed or utilized procedures would involve enormous energy requirements in order to resist the bending of a pipeline being laid in such depths.

It would, therefore, be desirable to develop apparatus and techniques for the offshore laying of pipeline which minimize the magnitude of restraint necessary to control pipeline profile.

It is, therefore, an object of the present invention to alleviate or obviate problems of the types previously discussed.

It is another object of the invention to facilitate the offshore laying of pipeline.

It is further object of the invention to reduce the extent to which restraint must be exerted on a pipeline to control its profile during offshore laying operations.

It is still another object of the invention to minimize the bending forces which are produced in a pipeline during such offshore laying operations.

It is yet another object of the invention to increase the water depths in which pipeline operations may be effectively and efficiently performed.

SUMMARY OF THE PREFERRED EMBODIMENTS OF THE INVENTION

In accomplishing at least some of these objects the present invention provides a method for the offshore laying of pipeline that is supported at its upper end to a floating vessel and at its lower end to the bed of a body of water. Individual rigid pipe sections are attached to the upper end of the pipeline. These sections are connected in end-to-end fashion for relative pivotal movement so as to define a pivotal pipeline assembly on the vessel. The pivotal pipeline assembly is fed in a generally fore-to-aft direction relative to the vessel toward a pipeline discharge zone of the vessel. At the discharge zone the pivotal pipeline assembly is guided from its fore-to-aft direction of feed into at least a substantially vertical path of descent into a body of water. Restraining forces are applied to the upper end of the pipeline assembly while regulating its descent to maintain the pipeline assembly in a substantially vertical descent path during a substantial portion of its descent through a body of water prior to assuming a generally curved transitional profile as it approaches contact with the waterbed.

The guiding of the pipeline assembly from its fore-to-aft feed direction to its substantially vertical descent path can be accomplished by passing the pipeline assembly onto a movable endless support structure attached to the vessel at the discharge zone. The endless support structure may, in one preferred embodiment of the invention, be in the form of a rotatable wheel having mutually inclined circumferential segments which receive the pipeline. In another preferred embodiment of the invention, the endless support structure may comprise an endless conveyor belt having mutually inclined support flights for receiving the pipe sections.

THE DRAWINGS

Other objects and advantages of the present invention will become apparent from the subsequent detailed description thereof in connection with the accompanying drawings in which like numerals designate like elements, and in which.

DETAILED DESCRIPTION OF THE PREFERRED EMBODIMENTS

Figure 1:
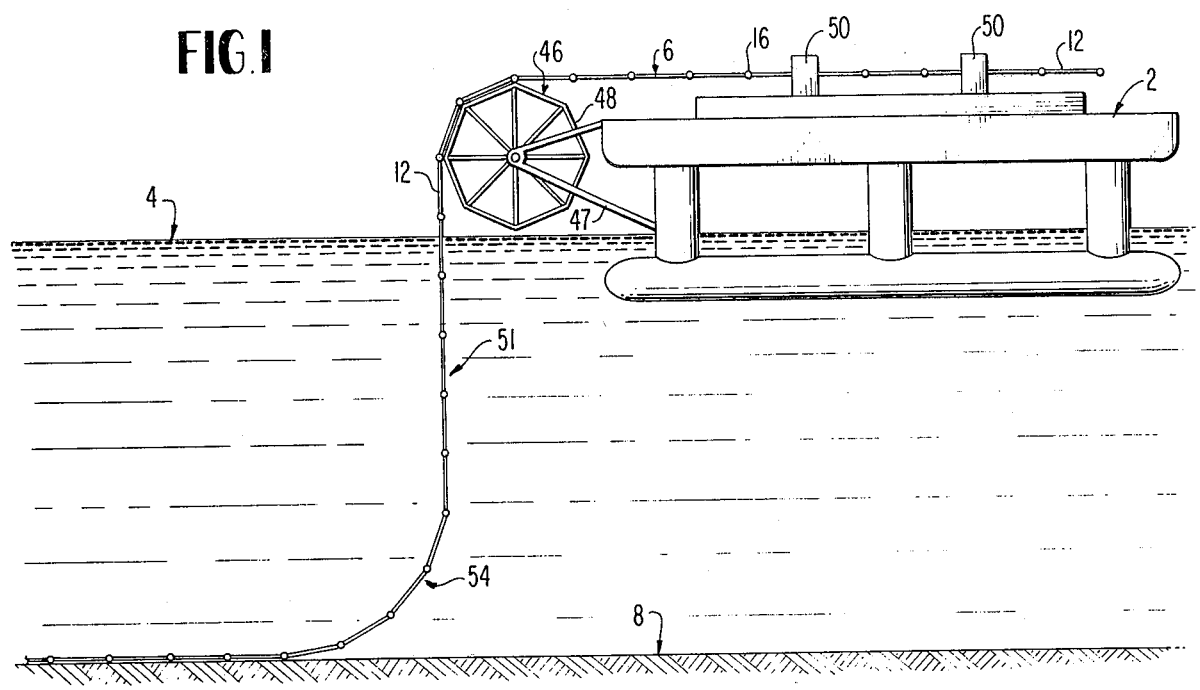
FIG. 1 is a side elevational view schematically depicting a pipeline laying vessel during a pipeline laying operation, the vessel carrying one preferred form of pipeline guiding structure.

A pipeline laying vessel 2 is illustrated in FIG. 1 as being floatingly disposed on a body of water 4. The laying vessel may be in the form of a floating barge or a semi-submersible vessel, depending upon sea conditions and other factors. The vessel is engaged in the laying of an elongate pipeline 6 which is supported at its upper end on the vessel 2 and is supported at its lower end on the bed 8 of the body of water 4. During the operations depicted in FIG. 1, the laying proceeds by attaching rigid pipe sections 12 to the upper end of the pipeline and then paying-out the pipeline into the water. The pipe sections 12 can be stored on the vessel and attached at connecting stations by facilities that are conventional and omitted for clarity. The pipe sections 12 are interconnected in end-to-end or serial fashion by means of swivel joints 16.

The swivel joints 16 are of a type capable of convenient attachment between adjacent pipe sections. Functionally, the swivel joints afford at least limited relative pivotal movement between adjoining pipe sections and serve to transmit axial forces between the pipe sections. Swivel joints for pipe sections are not novel in themselves as can be seen, for example, from U.S. Pat. Nos. 111,498; 486,986; 3,592,239; 3,658,366; and 3,727,954. The present invention involves the utilization of swivel joints in conjunction with pipeline laying methods and apparatus to produce advantages not heretofore realized.

Figure 3:
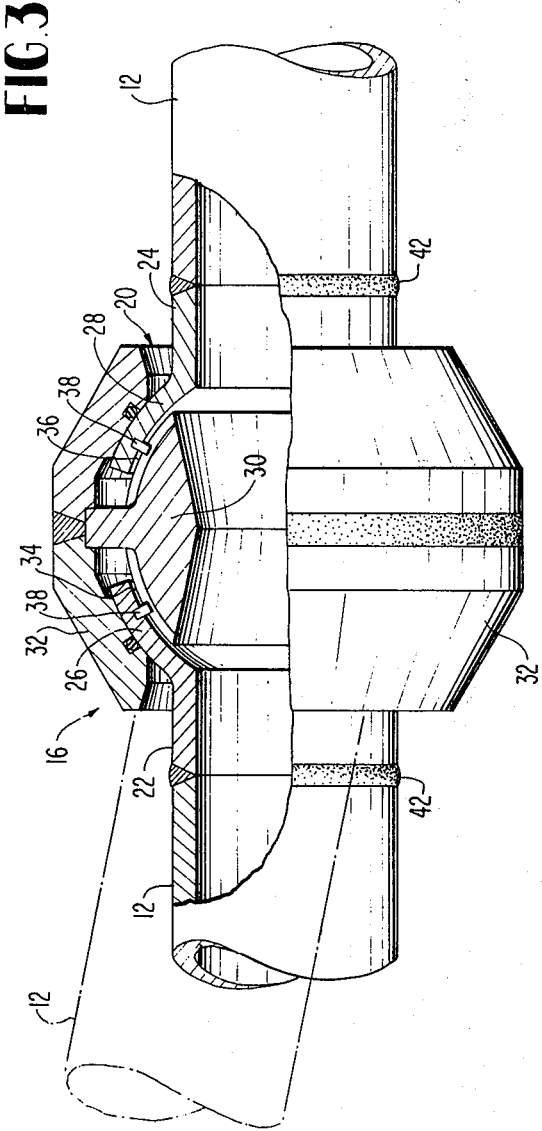
FIG. 3 depicts a ball joint for pivotally interconnecting a pair of pipe sections.

A suitable form of swivel joint 16 is illustrated in FIG. 3 and includes a pair of connector elements 18, 20. These connector elements have tubular portions 22, 24 that are rigidly attachable, such as by welding, to the ends of rigid pipe sections. At their other ends, the coupling elements 18, 20 include cup-shaped portions 26, 28 which, disposed adjacently, define a recess for the reception of a swivel ball 30. The swivel ball 30 is rigidly connected to the outer housing segment 32. The channel sections occurring between the housing segment 32 and the swivel ball 30 define curved tracks 34, 36 within which the cup-shaped portions 26, 28 can slide.

Thus, relative articulated movement between the adjoining pipe sections is afforded at least to a limited extent (see the phantom line depiction of a pivotal pipe section in FIG. 3). The magnitude of such pivotal movement can be selected in accordance with the nature of the pipeline laying operation to be conducted. Guide pins 38 are disposed on the cup-shaped portions and are slidably received within slots in the swivel ball 30 to guide the pipe sections during pivotal movements.

The location of the cup-shaped portions within the housing 32 enables the swivel joint 6 to transmit axially directed forces in tension and compression between adjacently connected pipe sections.

A concrete cover can be provided for the pipe sections if deemed necessary.

Aboard the vessel 2, the pipe sections 12 are assembled to the upper end of the pipeline 6 in end-to-end fashion — through the interposition of the swivel joints 16. In accomplishing this, the ends of serially arranged pipe sections 12 are welded, as at 42, to the tubular portions 22, 24 of the swivel joint 16.

Once assembled, the pivotal pipeline assembly is fed in a fore-to-aft direction along the vessel. In order to support the pipeline assembly during such travel; appropriate support structure, such as an elongate trough for example, can be utilized. Such structure has been omitted from the drawings for the sake of clarity.

At the aft end of the vessel the pipline assembly is discharged into the body of water. In so doing, the pipeline is guided from its fore-to-aft direction of feed into a substantially vertical path of descent through the body of water. In order to guide the pipeline assembly during this change of direction, an endless support arrangement is utilized. As will be discussed, the support arrangement is of a type capable of supporting the pipeline through its transitional travel period while allowing the pipe sections to swivel, thereby avoiding the generation of harmful stressing.

One suitable form of guide unit is depicted in FIG. 1 and comprises a rotatable wheel unit 46 attached to the vessel 2 by carrier bracing 47. The wheel unit 46 includes an endless periphery on which the pipeline segments are supported. The outer periphery comprises a plurality of circumferential segments 48. The circumferential segments are dimensioned and angled to accommondate the individual pipe sections 12 and guide the pipe sections during travel thereof from the fore-to-aft feed direction into a substantially vertical path of descent through the body of water 11.

The pipeline is paid-out by advancing the vessel relative to the pipeline. The vessel can be advanced in conventional fashion, i.e., by winching-in anchor lines at the bow end of the vessel while paying-out anchor lines at the stern of the vessel by equivalent amounts.

During the pipe-laying operation the pivotal pipeline assembly is restrained by means of one or more constant tensioner units 50. These tensioner units may, for example, be of the type which operate in accordance with principles discussed in the afore-mentioned U.S. Lawrence Pat No. 3,390,532. The tensioner units apply a substantially constant longitudinal tension to the pipeline to control its downward descent.

Descent of the pipeline is regulated in accordance with forward movement of the vessel to maintain the descent path of the pipeline as close to vertical as possible. It will be apparent that there may be a slight deviation of the pipeline from vertical due to wave action or other factors. These deviations are easily accommodated, of course, by the pivotal joints between the pipe sections without placing significant bending stresses on the pipeline.

The substantially vertical descent portion 51 of the descending travel of the pipeline occurs for a substantial part of its descending travel, as is depicted in FIG. 1. As the pipeline approaches contact with the bed 8 of the body of water 11, the pipeline assumes a curved profile, as at 54, before settling onto the waterbed. The pivotal relationship of the pipe sections accommodates such a transitional curvature on a relatively small radius without the creation of significant bending stresses in the pipeline.

Figure 2:
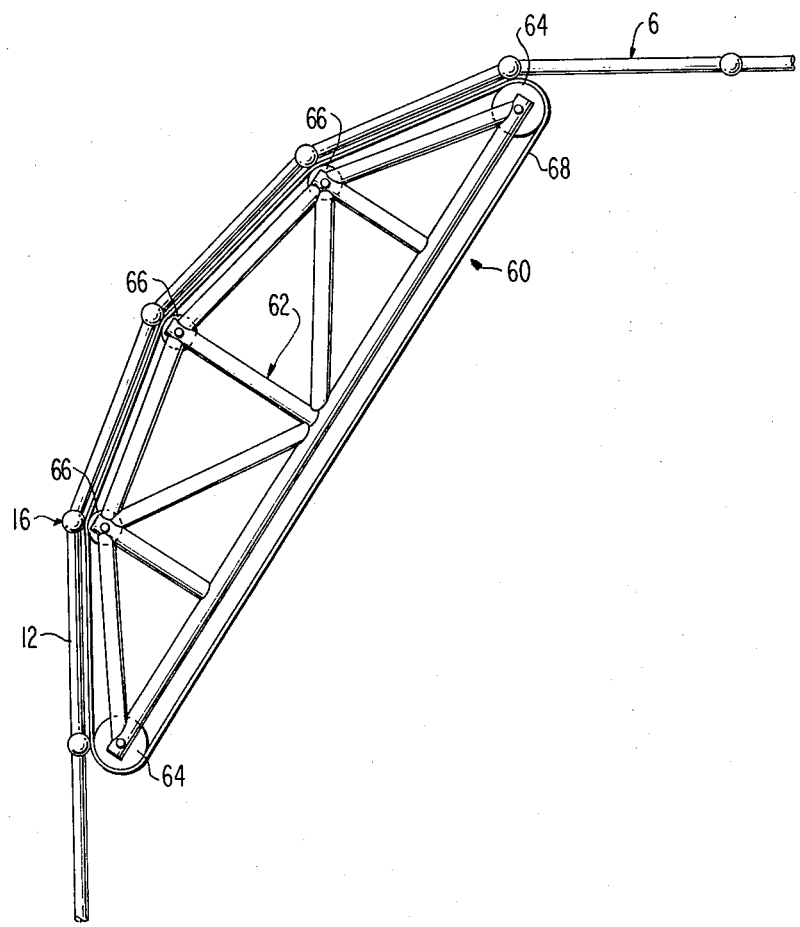
FIG. 2 depicts, in side elevational view, a second preferred form of pipeline guiding structure.

An alternate form of guide unit 60 is illustrated in FIG. 2. This unit 60 comprises a stationary frame assembly 62 which is suitably fixed to the pipeline discharge end of the lay vessel 2. At the ends of the guide unit 60, and at points intermediate the ends, there are provided rotary pulleys 64, 66. Around the pulleys there is disposed an endless belt 68 which is capable of free movement around the frame assembly 62. Serially arranged flights of the endless conveyor belt 68 define support segments which are of a length substantially equal to the lengths of the pipe sections 12. These support segments are mutually inclined relative to one another to guide the pipeline from its fore-to-aft feed direction to a substantially vertical descent path.

In OPERATION, with the pipeline being supported between the waterbed 8 and the vessel 2, additional pipe sections 12 are serially attached to the upper end of the pipeline 6 by means of swivel connectors 16. The vessel 2 is then advanced relative to the pipeline such that the pipeline travels in a fore-to-aft path along and relative to the vessel. At the discharge end of the vessel the guide unit 46 or 60 guides the pipeline from its fore-to-aft feed direction into a substantially vertical descent path 51. The tensioner units 50 apply longitudinal restraining forces to the pipeline to aid in regulating its descent.

The pipeline descends in a substantially vertical posture for a substantial portion 51 of its descent toward the waterbed 8. As the pipeline approaches contact with the waterbed, it assumes a generally curved transitional profile as at 54. Finally, the pipeline assumes a rest posture on the waterbed.

As noted previously, the pipeline descends in at least a substantially vertical travel path during a substantial portion of its descending travel. It will be apparent that during this period the primary force to be countered, or resisted, by the tensioner units 50 is the vertical weight component of the pipeline. There exist no significant bending forces of the type and magnitude which occur during the laying of a pipeline having a sloping trajectory from the vessel to the waterbed. The magnitude of the restraining forces to be applied by the tensioner units, or other resistance units being utilized, are thereby significantly reduced by the present invention. This is of particular importance in deep-water laying operations where the bending forces accompanying conventional laying techniques would be especially large.

Figure 4:
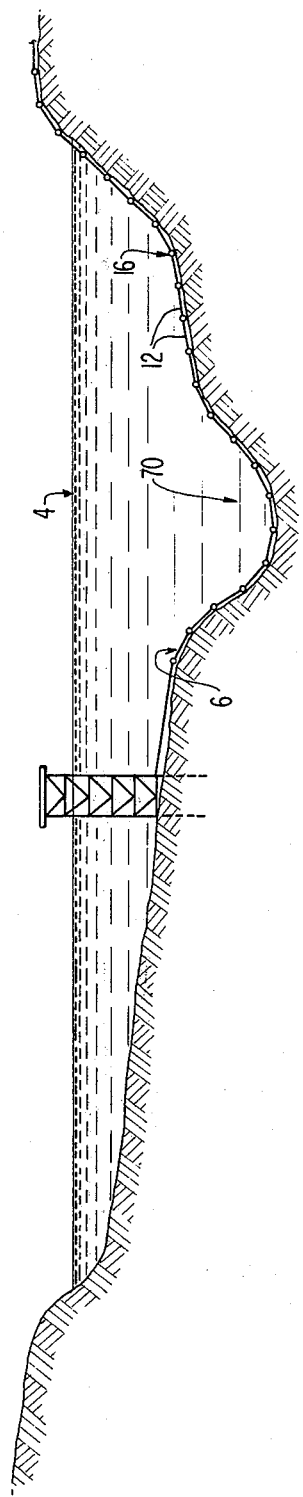
FIG. 4 is a cross-sectional view schematically depicting a pipeline which has been laid on the bed of a body of water in accordance with the present invention.

It will also be apparent that by virtue of the pivotal connections between the pipe sections, the pipeline can conform more readily to an irregularly configured waterbed without the occurrence of undue stressing in the pipeline. Such a situation is depicted in FIG. 4 which schematically illustrates, in cross section, a portion of the North Sea between Norway and Scotland which includes the Norway Groove 70. Water depths in this region are extremely great. In accordance with the present invention, however, the pipeline can be effectively and efficiently laid without the need for stingers and without the imposition of unduly large bending forces. The tensioner units will be capable of exerting the necessary restraint on the pipeline. Also, the pivoted pipeline assembly conveniently conforms to the irregular underwater terrain.

It should be understood that the pivotal pipeline assembly can be utilized wherever it is deemed desirable to reduce bending stresses. For instance, a pipeline can be initially laid by paying out rigidly and directly welded pipe sections in conventional fashion until relatively deep-water conditions are encountered, at which point the pivotal apparatus and techniques disclosed herein may be utilized.

MAJOR ADVANTAGES OF THE INVENTION

By virtue of the principles disclosed in the foregoing discussion, a pipeline can be layed without imposing unduly large energy requirements on the pipeline supporting mechanism. Laying operations are thereby facilitated, especially in deep water environments. In most instances, the pipeline can be amply supported by one or more tensioner units — without the need for a stinger. Moreover, the very irregular underwater terrains now being encountered with relative frequency in deep water locations need not present as much of a hazzard to a pipeline since the pipeline can more easily conform to irregular waterbed shapes.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method for the offshore laying of pipeline supported at its upper end on a floating vessel and at its lower end on the bed of a body of water comprising the steps of:

assembling individual rigid sections of pipe connected in end-to-end fashion for relative pivotal movement on said floating vessel to define an articulated pipeline assembly on said vessel;

said articulated pipeline assembly comprising rigid sections of pipe shorter in length than the depth of said body of water, and pivot joints interconnecting said lengths and operable to provide a plurality of pivoted, stress relieving joints in said assembly between said floating vessel and said bed of said water body when said assembly is suspended therebetween;

feeding said articulated pipeline assembly in a generally fore-to-aft direction relative to said vessel toward a pipeline discharge zone of said vessel;

guiding said articulated pipeline assembly at said discharge zone from its fore-to-aft direction of feed through a progressive direction changing zone into at least a substantially vertical path of descent in said body of water;

said articulated pipeline assembly, when in said progressive direction changing zone, including plural rigid lengths and pivot joints articulated in a generally curved configuration extending generally tangentially downward into said substantially vertical path;

said articulated pipeline assembly, when within said vertical path, being articulated and free of significant bending force acting thereon, with said rigid sections depending generally vertically downwardly from said pivot joint, being spaced from said bed of said body of water, and being substantially free of significant bending forces acting thereon; and applying restraining forces to the upper end of said articulated pipeline assembly while regulating the descent of said articulated pipeline assembly to maintain said pipeline assembly in its substantially vertical descent path during a substantial portion of its descent through said body of water prior to assuming a generally curved transitional profile as it approaches contact with the bed of the body of water;

said articulated pipeline assembly, when within said generally curved transitional profile including plural rigid lengths and pivot joints articulated in a generally curved configuration extending generally tangentially downwardly from said substantially vertical path.

2. A mehtod according to claim 1 wherein said step of guiding said pipeline assembly comprises passing said pipeline assembly onto a movable endless support means attached to said vessel at said discharge zone.

3. A method according to claim 2 wherein said step of guiding said pipeline assembly further comprises passing said pipeline assembly onto a mutually inclined segment of said endless guide means.

4. A method according to claim 1 wherein said step of guiding said pipeline assembly comprises passing said pipeline assembly onto the mutually inclined circumferential support segments of a rotatable guide wheel located at said discharge zone such that said wheel rotates as said pipeline is being payed out.

5. A method according to claim 1 wherein said step of guiding said pipeline assembly comprises passing said pipeline assembly onto the mutually inclined support flights of an endless conveyor belt located at said discharge zone.

6. A method according to claim 1 wherein said step of attaching pipe sections for pivotal movement occurs after an initial section of the pipeline has been laid by directly welding together rigid pipe sections and paying-out such directly welded sections in generally sloping fashion from said vessel to said waterbed.

7. Apparatus for the offshore laying of pipeline comprising:

a vessel floating on a body of water;

pipeline means operable to extend between the vessel and the bed of said body of water; means on said vessel for connecting individual rigid sections of said pipeline means in end-to-end fashion for relative pivotal movement to define an articulated pipeline assembly on said vessel;

said articulated pipeline assembly comprising rigid sections of pipe shorter in length than the depth of said body of water, and pivot joints interconnecting said lengths and operable to provide a plurality of pivoted, stress relieving joints in said assembly between said floating vessel and said bed of said water body when said assembly is suspended therebetween;

means for feeding said articulated pipeline assembly in a generally fore-to-aft direction relative to said vessel toward a pipeline discharge zone of said vessel;

means at said discharge zone for guiding said articulated pipeline assembly from its generally fore-to-aft feed path through a progressive direction changing zone into at least a substantially vertical path of descent in said body of water;

said articulated pipeline assembly, when in said progressive direction changing zone, including plural rigid lengths and pivot joints articulated in a generally curved configuration extending generally tangentially downward into said substantially vertical path;

said articulated pipeline assembly, when within said vertical path, being articulated and free of significant bending force acting thereon, with said rigid sections depending generally vertically downwardly from said pivot joint, being spaced from said bed of said body of water, and being substantially free of significant bending forces acting thereon; and means applying restraining forces to said articulated pipeline assembly to regulate the descent of said articulate pipeline assembly so as to maintain said pipeline assembly in its substantially vertical descent path during a substantial portion of its descent through said body of water prior to assuming a generally curved transition profile as it approaches contact with said waterbed;

said articulated pipeline assembly, when within said generally curved transitional profile including plural rigid lengths and pivot joints articulated in a generally curved configuration extending generally tangentially downwardly from said substantially vertical path.

8. Apparatus according to claim 7 wherein said guiding means comprises a movable endless support means attached to said vessel at said discharge zone.

9. Apparatus according to claim 8 wherein said support means includes mutually inclined support segments.

10. Apparatus according to claim 7 wherein said guiding means comprises a rotatable wheel secured to said vessel at said discharge zone; said wheel including mutually inclined circumferential support segments.

11. Apparatus according to claim 7 wherein said guiding means comprises an endless conveyor belt secured to said vessel at said discharge zone; said belt being arranged to define a plurality of mutually inclined support flights.

* * * * *